US007353966B2

(12) United States Patent
McKinnon, Jr.

(10) Patent No.: US 7,353,966 B2
(45) Date of Patent: Apr. 8, 2008

(54) METER BOX LID WITH SNAP FIT PASSAGE

(76) Inventor: Robert McKinnon, Jr., P.O. Box 648, Bedford, TX (US) 76021-0648

( * ) Notice: Subject to any disclaimer, the term of this patent is extended or adjusted under 35 U.S.C. 154(b) by 225 days.

(21) Appl. No.: 11/287,894

(22) Filed: Nov. 28, 2005

(65) Prior Publication Data

US 2006/0151500 A1    Jul. 13, 2006

Related U.S. Application Data

(60) Division of application No. 10/417,319, filed on Apr. 16, 2003, now Pat. No. 6,968,969, which is a continuation-in-part of application No. 09/579,630, filed on May 26, 2000.

(51) Int. Cl.
*B65D 88/76* (2006.01)
*B65D 90/10* (2006.01)
*B65D 90/48* (2006.01)

(52) U.S. Cl. ............... 220/484; 220/501; 220/522; 220/735

(58) Field of Classification Search ............... 220/3.6, 220/3.3, 3.5, 484, 501, 521, 735, 736, 697, 220/522
See application file for complete search history.

(56) References Cited

U.S. PATENT DOCUMENTS

| 2,883,853 | A |   | 4/1959  | Forni |
| 3,263,853 | A |   | 8/1966  | Smith |
| 3,417,894 | A |   | 12/1968 | Gittler |
| 3,858,755 | A |   | 1/1975  | Tellen |
| 3,921,449 | A |   | 11/1975 | Hauffe et al. |
| 3,952,908 | A |   | 4/1976  | Carson |
| 4,163,503 | A |   | 8/1979  | McKinnon |
| D257,133  | S |   | 9/1980  | McKinnon |
| 4,279,354 | A |   | 7/1981  | Conti |
| 4,302,499 | A |   | 11/1981 | Grisch |
| 4,518,097 | A |   | 5/1985  | Milton et al. |
| 4,611,713 | A |   | 9/1986  | Byrns |
| 4,669,305 | A |   | 6/1987  | Rivero-Olmedo |
| 4,726,490 | A |   | 2/1988  | Bonnema et al. |
| 4,809,548 | A |   | 3/1989  | Rivero-Olmedo |
| 4,872,575 | A |   | 10/1989 | Kobilan |
| 4,967,944 | A |   | 11/1990 | Waters |
| 5,016,756 | A |   | 5/1991  | Wischhusen et al. |
| 5,111,938 | A |   | 5/1992  | Soprano et al. |
| 5,123,776 | A |   | 6/1992  | Lang et al. |
| 5,249,697 | A |   | 10/1993 | McKinnon |
| 5,298,894 | A | * | 3/1994  | Cerny et al. ........... 340/870.02 |
| 5,312,202 | A |   | 5/1994  | Newton |

(Continued)

*Primary Examiner*—Anthony D. Stashick
*Assistant Examiner*—Niki M. Eloshway
(74) *Attorney, Agent, or Firm*—Geoffrey A. Mantooth

(57) ABSTRACT

The lid is used to cover a utility box which houses a meter such as a water meter. The lid is compression molded from a plastic material such as medium density polyethylene, and has a planar upper surface and a planar lower surface. In one embodiment, a plurality of generally parallel spaced apart recesses are formed in the lower surface. The recesses are spaced inward of the outer edges of the lid. The area of the lower surface of the lid is greater than the total area of the recesses in the plane of the lower surface. In another embodiment, an opening leading to a cavity is formed in the edge of the lid with a press fit passage for receiving a transponder device.

6 Claims, 16 Drawing Sheets

U.S. PATENT DOCUMENTS

| | | |
|---|---|---|
| 5,333,750 A | 8/1994 | McKinnon |
| 5,358,133 A | 10/1994 | Gillispie et al. |
| 5,394,601 A | 3/1995 | Sutton et al. |
| 5,423,448 A | 6/1995 | Pedigo |
| 5,544,974 A | 8/1996 | Berg et al. |
| 5,545,559 A | 8/1996 | Kariniemi |
| 5,564,586 A | 10/1996 | Goodwin |
| 5,641,090 A | 6/1997 | Kowalski et al. |
| 5,671,846 A | 9/1997 | Frank |
| 5,685,452 A | 11/1997 | Kristoffersson |
| 5,791,098 A | 8/1998 | Thomas |
| 5,881,880 A | 3/1999 | Jacques et al. |
| 5,941,410 A * | 8/1999 | Mangano .................... 220/735 |
| 6,047,841 A | 4/2000 | Chen |
| 6,177,883 B1 * | 1/2001 | Jennetti et al. ........ 340/870.02 |
| 6,218,995 B1 | 4/2001 | Higgins et al. |
| 6,369,769 B1 | 4/2002 | Nap et al. |
| 6,378,817 B1 | 4/2002 | Bublitz et al. |
| 6,414,605 B1 | 7/2002 | Walden et al. |
| 6,617,976 B2 | 9/2003 | Walden et al. |
| 6,851,567 B2 * | 2/2005 | McKinnon ............... 220/254.3 |
| 6,968,969 B1 * | 11/2005 | McKinnon, Jr. ............ 220/484 |

* cited by examiner

FIG. 9
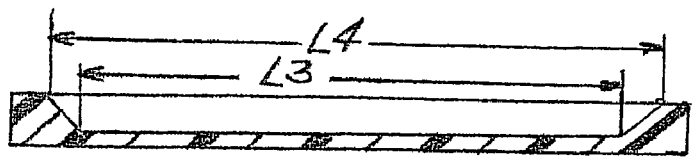
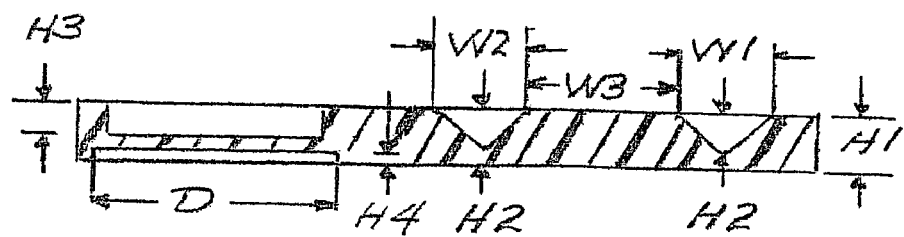
FIG. 10
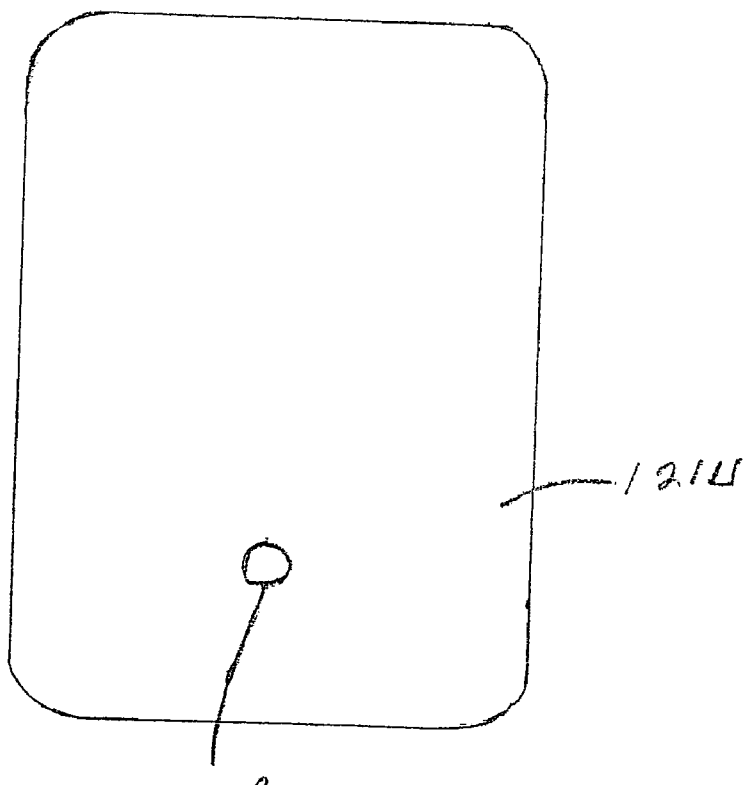
FIG. 12

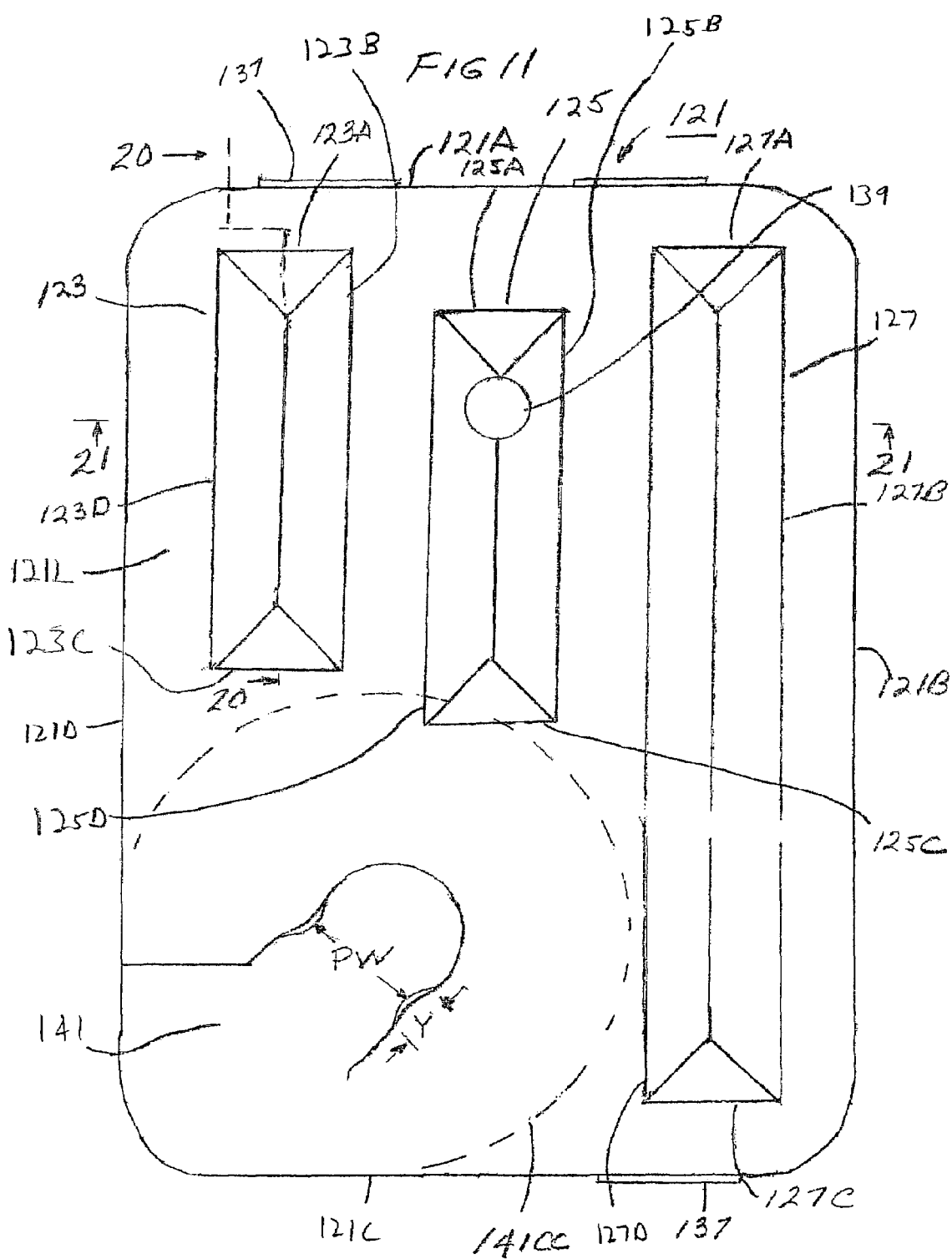

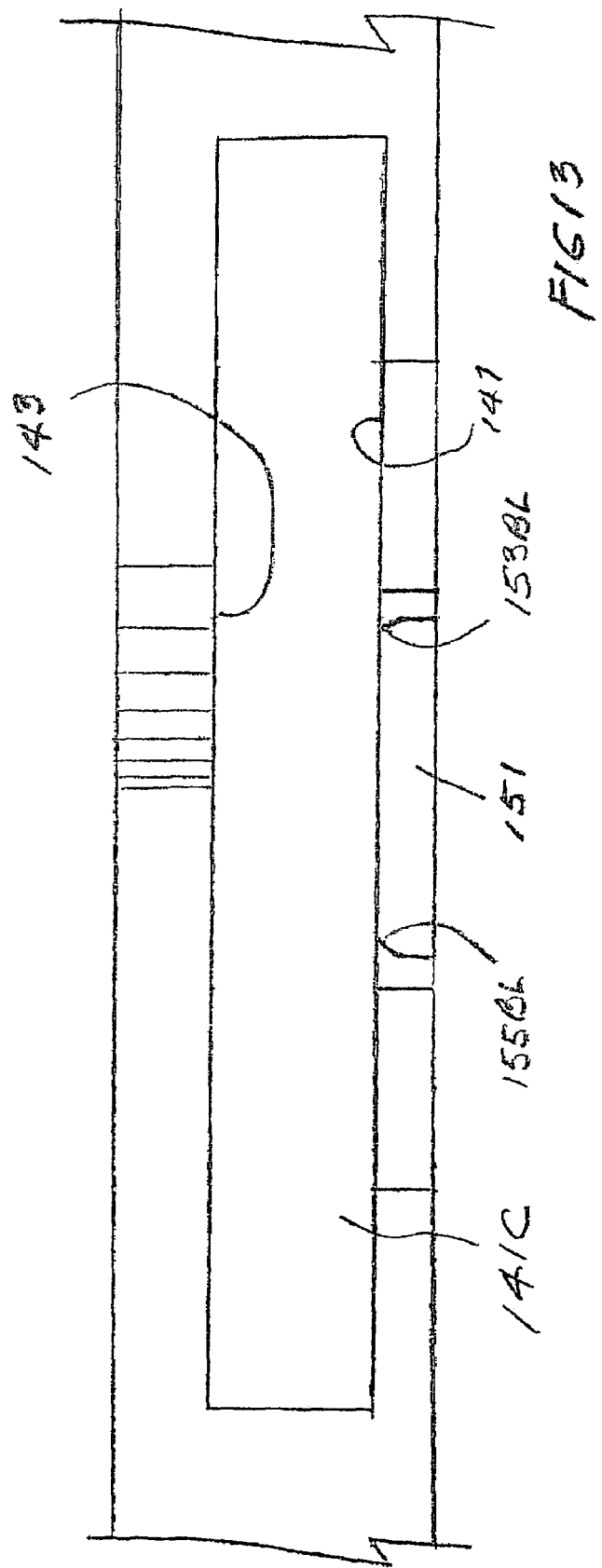

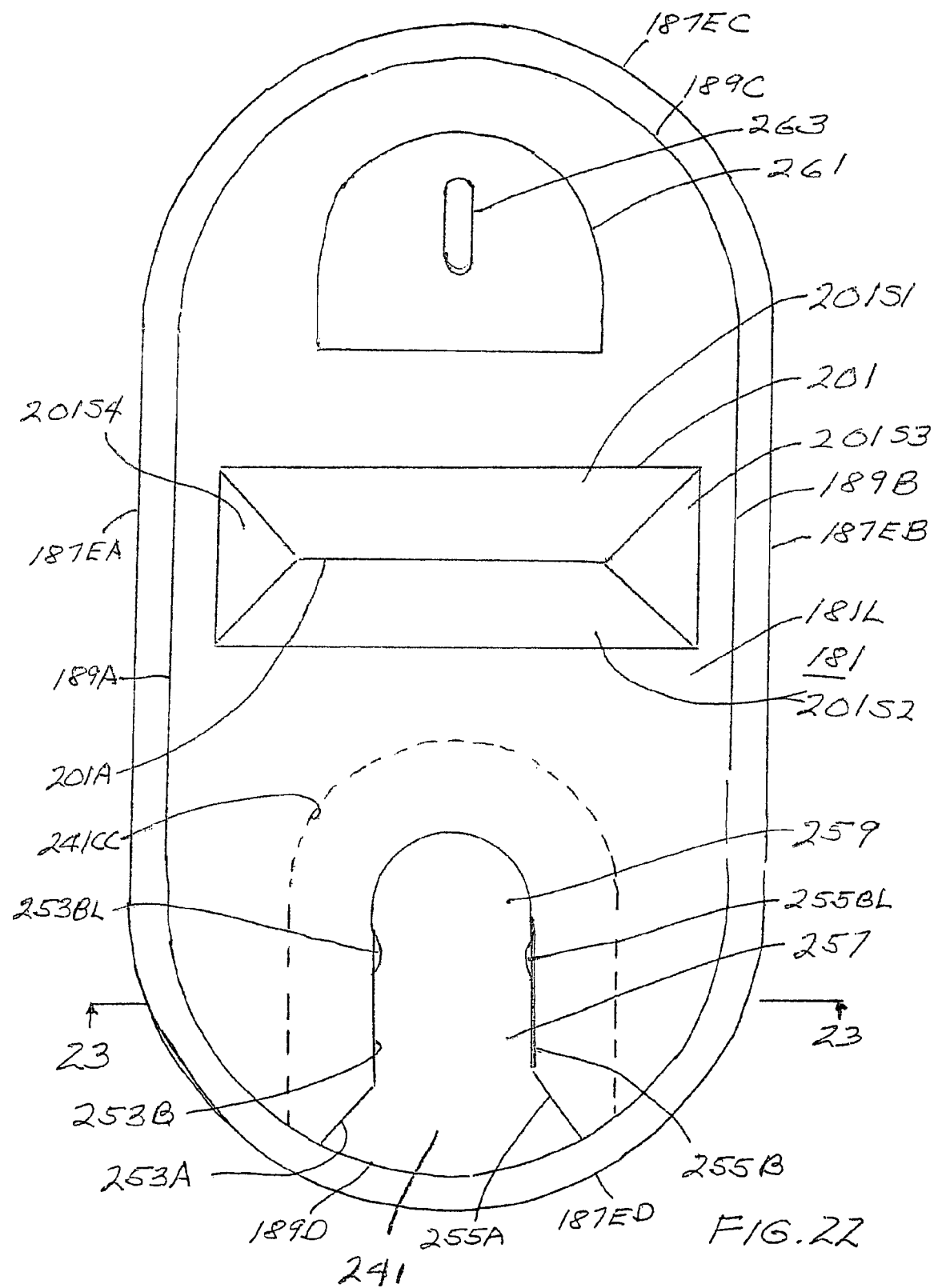

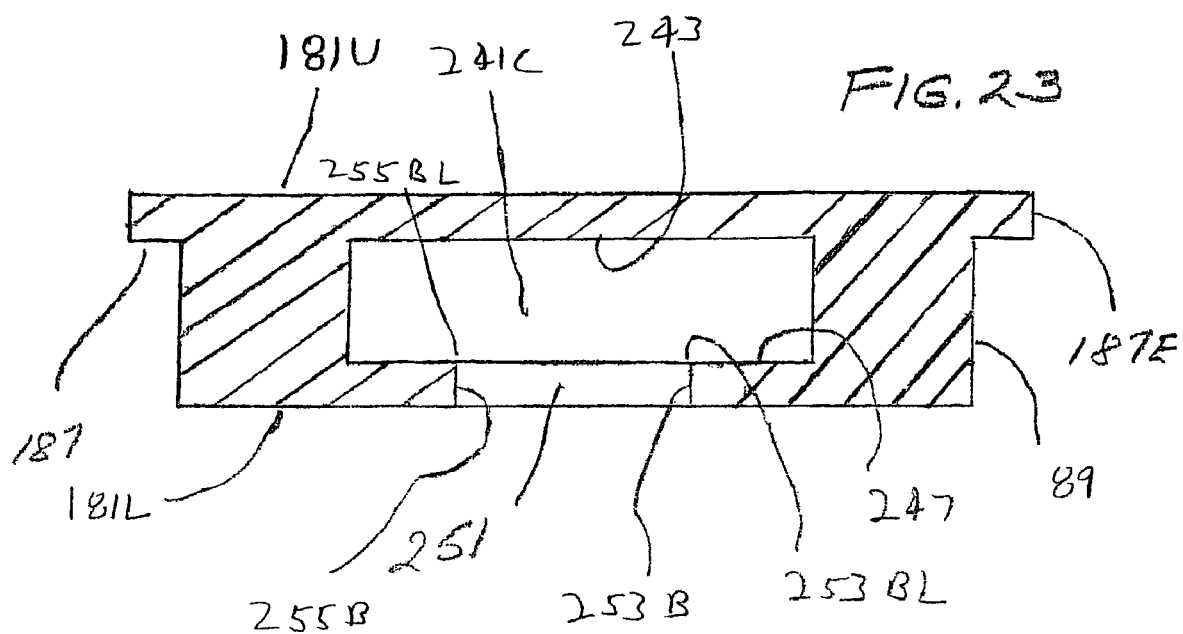

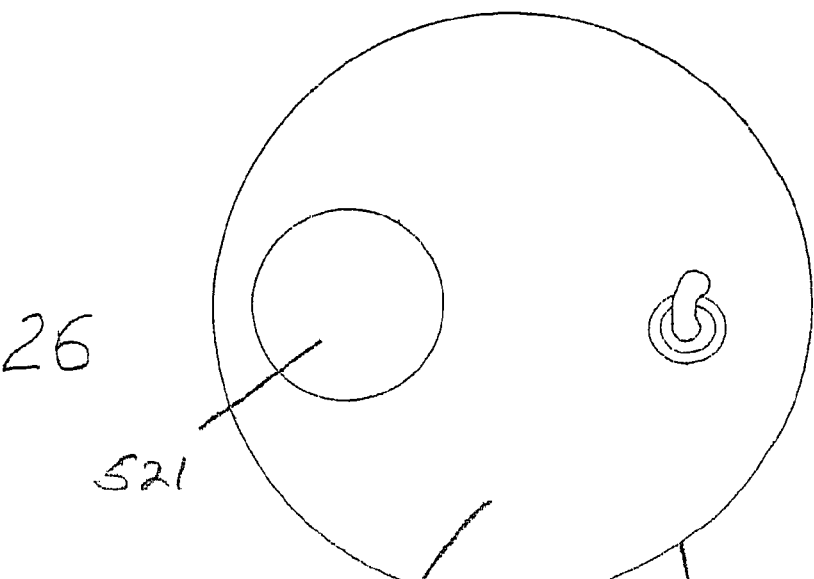
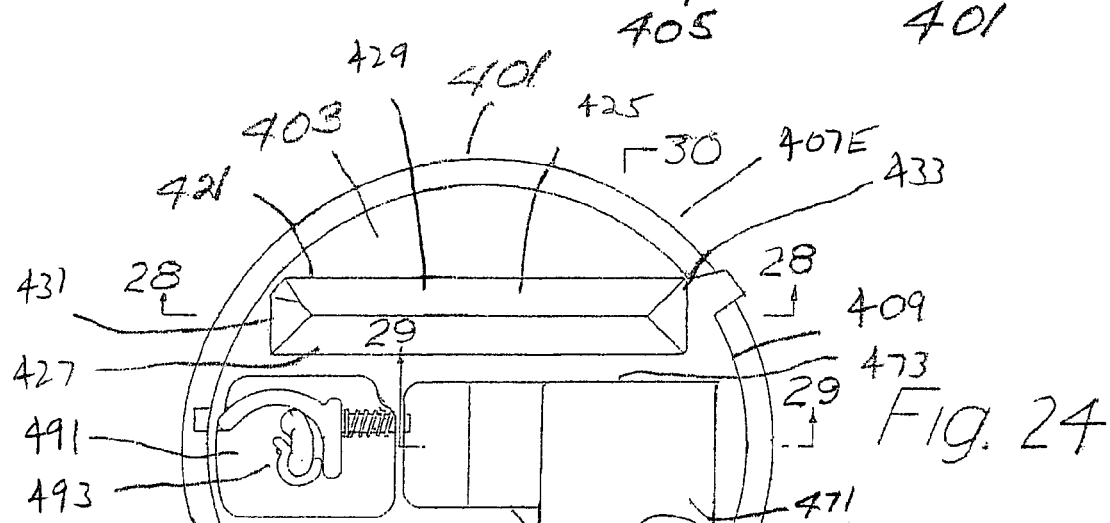
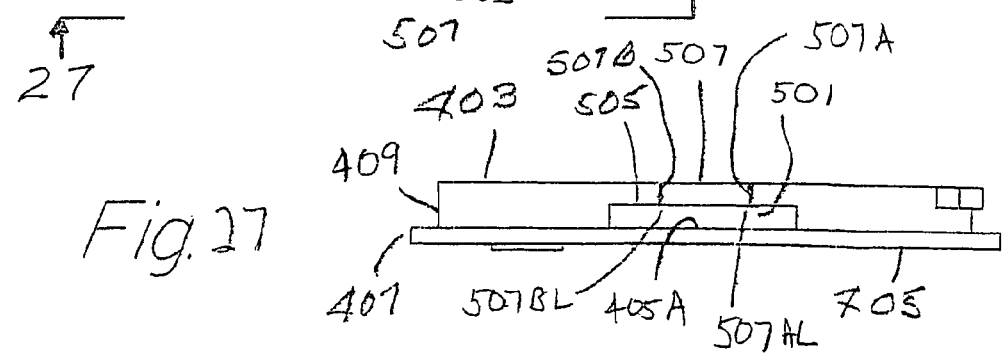

METER BOX LID WITH SNAP FIT PASSAGE

This application is a divisional patent application of application Ser. No. 10/417,319, filed Apr. 16, 2003, now U.S. Pat. No. 6,968,969 which application was a continuation-in-part of U.S. patent application Ser. No. 09/579,630, filed May 26, 2000.

FIELD OF THE INVENTION

The invention relates to a removable lid for covering a utility box such as a water meter box.

DESCRIPTION OF THE PRIOR ART

In the past, utility boxes such as water meter boxes have been made of concrete or plastic with lids formed of the same material. U.S. Pat. Nos. 2,883,853, 4,163,503, 4,726,490, 5,423,448, 5,394,601, and 5,791,098 disclose different types of lids.

Meter box lids also have been employed for holding transponder devices for enabling personnel to read water meters from a distance without leaving the utility truck. One transponder device used comprises a disc for supporting an electromagnetic receiver and transmitter apparatus and a stem attached thereto for enclosing components to be attached to the meter. Some of the lids are formed of concrete or plastic and have a slot molded in its outer edge for holding the transponder device.

SUMMARY OF THE INVENTION

It is an object of the invention to provide a new and useful, strong, heavy duty lid for a utility box and which may be used on concrete or plastic boxes. The lid in one embodiment comprises a member formed of a plastic material with elongated recesses formed in the lower surface which minimizes breakage of the lid. The recesses are spaced inward of the outer edges of the lid member. The recesses are generally parallel to each other and have lengths equal to a substantial portion of the length of the lid along which the recesses extend.

It is a further object of the invention to provide a lid for a utility box which has a cavity formed in its edge which defines a lower wall for supporting the disc shaped housing of a transponder device of the type having a stem connected to the housing. The lower wall has an opening in communication with the cavity and a smaller passage for receiving the stem of the transponder device. At least one edge of the passage is resilient which allows the stem to be pushed through the passage into the opening. The edge of the passage then returns to its normal state to hold the stem in the opening and hence the housing in the cavity during the intended use.

BRIEF DESCRIPTION OF THE DRAWINGS

FIG. 9 is a cross-sectional view of FIG. 2 taken along lines 9-9 thereof.

FIG. 10 is a cross-sectional view of FIG. 2 taken along lines 10-10 thereof.

FIG. 11 illustrates the bottom side of another lid of the invention.

FIG. 12 is a reduced drawing of the top side of the lid of FIG. 11.

FIG. 13 is an edge view of a cavity of the lid of FIG. 11 for holding a transponder device.

FIG. 22 is a plan view of the lower side of another lid of the invention.

FIG. 23 is a cross-sectional view of the lid of FIG. 22 as seen along lines 23-23 thereof.

FIG. 24 is a plan view of the lower side of another lid of the invention.

FIG. 26 is a plan view of the upper side of the lid of FIG. 24.

FIG. 27 is a view of the lid of FIG. 24 as seen along lines 27-27 thereof.

DESCRIPTION OF THE PREFERRED EMBODIMENTS

Figure 1:
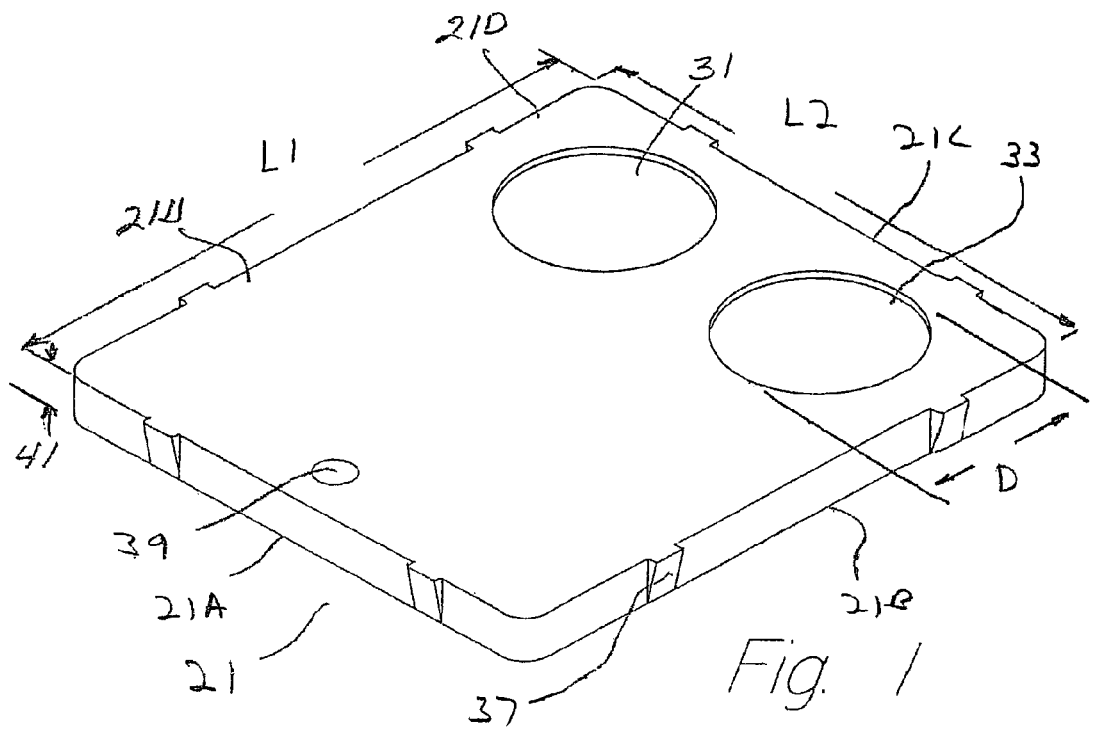
FIG. 1 illustrates the upper side of one of the lids of the invention.
Figure 2:
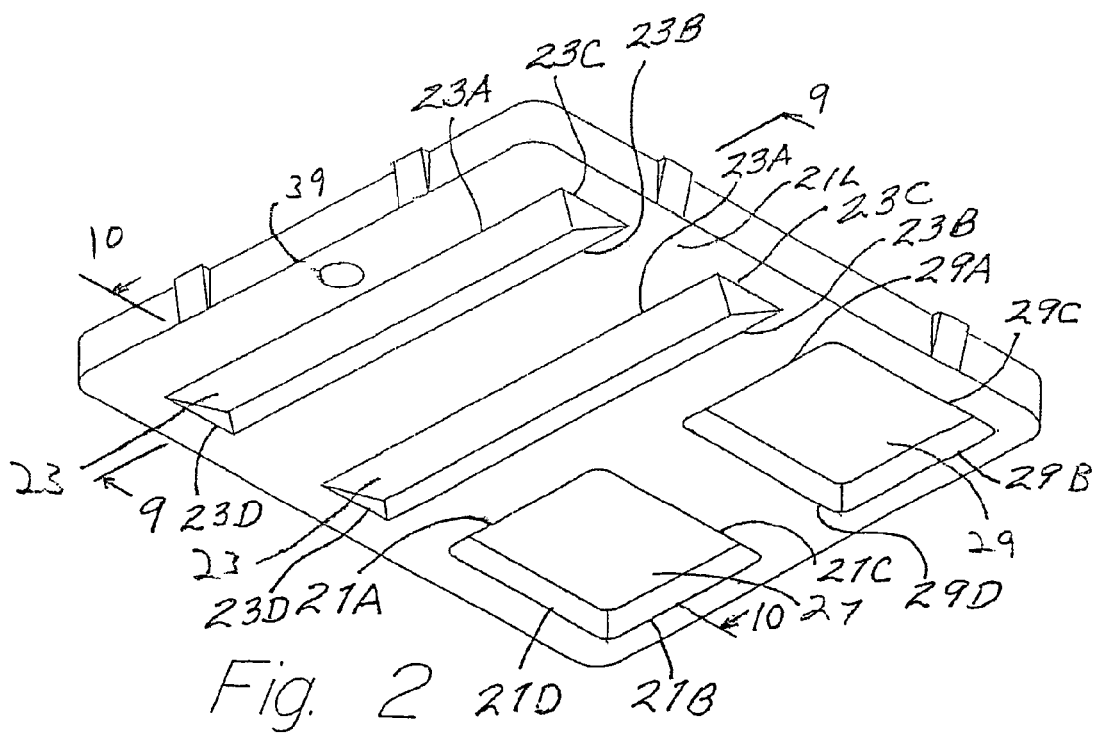
FIG. 2 illustrates the lower side of the lid of FIG. 1.

Referring now to FIGS. 1-10 of the drawings there is shown four lids 21, 21M, 61, and 61M which are compression molded from a suitable plastic material such as medium density polyethylene. Referring to FIGS. 1, 2, 9 and 10, the lid 21 comprises an upper side having a flat or planar upper surface 21U and a lower side having a flat or planar lower surface 21L. The upper and lower sides are rectangular with four edges 21A, 21B, 21C, and 21D. Formed in the lower surface 21L during the molding operation are two identical elongated, parallel recesses 23 and two identical, square recesses 27 and 29. The recesses 23 have outer edges 23A, 23B, 23C, 23D. The recess 27 has outer edges 27A, 27B, 27C, 27D. The recess 29 has outer edges 29A, 29B, 29C, 29D. Formed in the upper surface 21U during the molding process are two identical, circular recesses 31 and 33 which are generally aligned with the two square recesses 27 and 29 respectively. Also formed on each edge 21A, 21B, 21C and 21D are two spaced apart wedges 37 or lugs which extend outward from the upper surface 21U and taper downward to the lower surface 21L. The wedges 37 may be shaved or cut to the desired shape in order to allow the lid to fit into the top opening of the utility box. Also molded or drilled through the lid 21 is a finger hole 39 for gripping purposes to more easily allow the lid to be fitted to or removed from the utility box.

The purpose of the recesses 23 is to minimize breakage of the lid and the purpose of the recesses 27, 29 and 31, 33 is to receive remote reading equipment in the interior of the utility box and on the top of the lid 21. Apertures will be formed through the lid to provide an opening between the recesses 27 and 31 and to provide an opening between recesses 29 and 33 to allow connection between the interior and exterior equipment.

In one embodiment, the dimensions L1, L2, L3, L4, H1, H2, H3, H4, W1, W2, W3 and D in inches are about 16½, 14½, 10½, 12½, 1½, 1, 14/16, ¼, 2, 2½, 4¾, and 5 respectively.

Lids similar to lid 21 were produced but they did not have the recesses 23. If these lids were dropped on a hard surface, the lids would crack in some instances. Also when a high vertical pressure was applied to the lids when they were supported at the outer edges, they would break. The problem was solved however, by forming the recesses 23 during the molding process. The lid of FIGS. 1, 2, 9, 10 was tested by dropping it on a hard surface and by applying a high pressure to its upper surface 21U with the outer edges of its lower surface 21L supported by means and the lid did not crack or break. It is believed that the improved results were obtained since the recesses 23 allowed a better heat transfer of the hot flowable plastic during the molding process and they enhanced curing of the plastic. The recesses 27 and 29 have solved the prior problem at least on the side of the lid on which they are located. The area of the lower surface 21L is greater than the total area of the recesses 23, 27, and 29 in the plane of the surface 21L.

Figure 3:
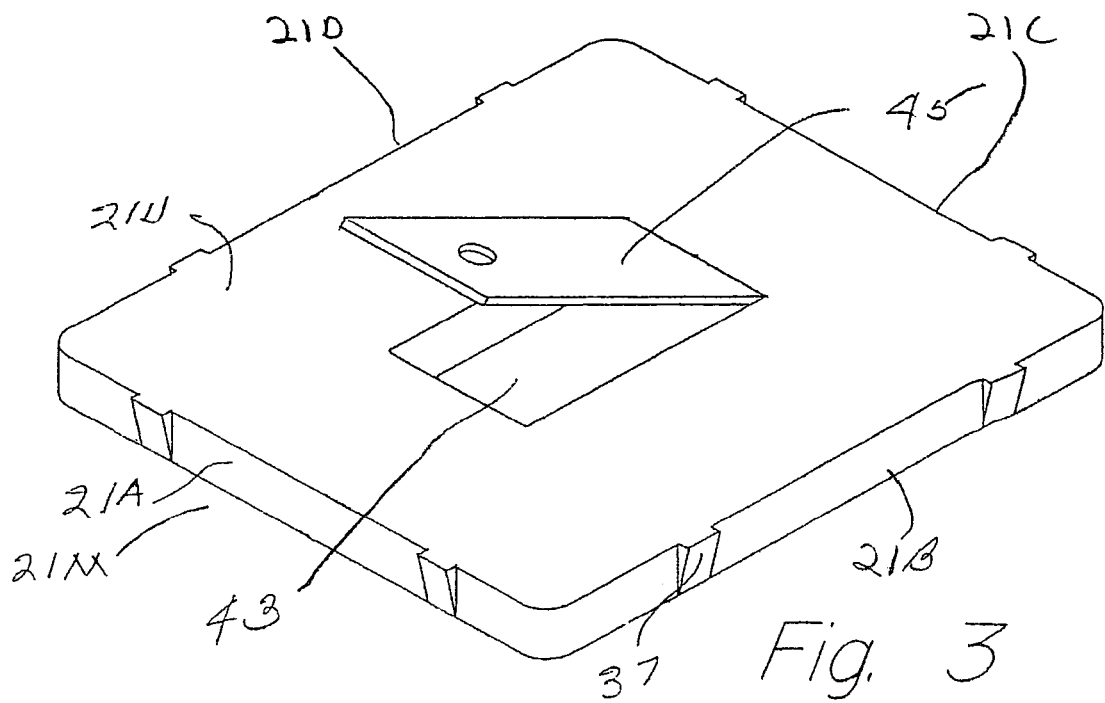
FIG. 3 illustrates the upper side of another lid of the invention.
Figure 4:
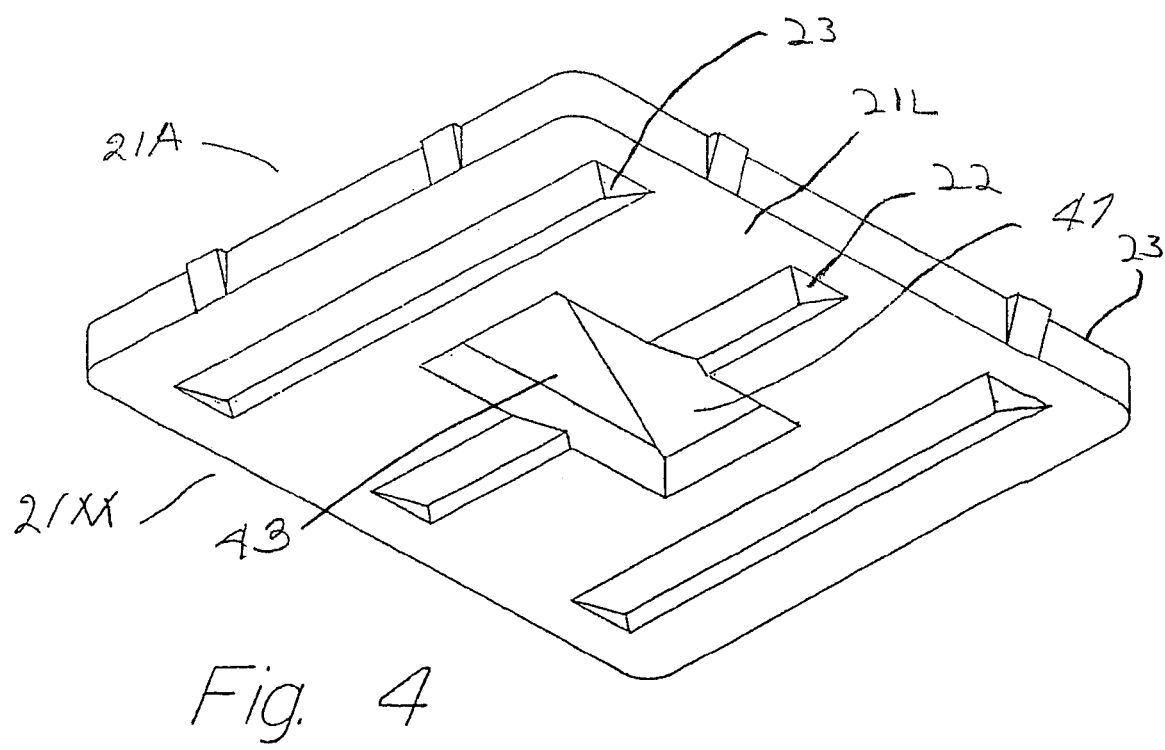
FIG. 4 illustrates the lower side of the lid of FIG. 3.

Referring to FIGS. 3 and 4, the lid 21M is similar to lid 21 except that it does not have recesses 27, 29, 31, 33; or the opening 39; it has an opening 43 formed through the lid at its central portion with a cover 45 hinged to the upper surface 21U to allow manual reading of the meter in the utility box and it has three identical excesses 23. In FIGS. 3 and 4, the same reference numerals as used in FIGS. 1, 2, 9, and 10 identify the same components and except for the differences mentioned above. The dimensions of lid 21M are the same as lid 21. Referring to FIG. 4, the outer recesses 23 are spaced about 2½ inches from the central recess 23. The opening 43 may have side dimensions in inches of 3¾×6⅞. The lid 21M is compression molded from a plastic material such as medium density polyethylene.

Figure 5:
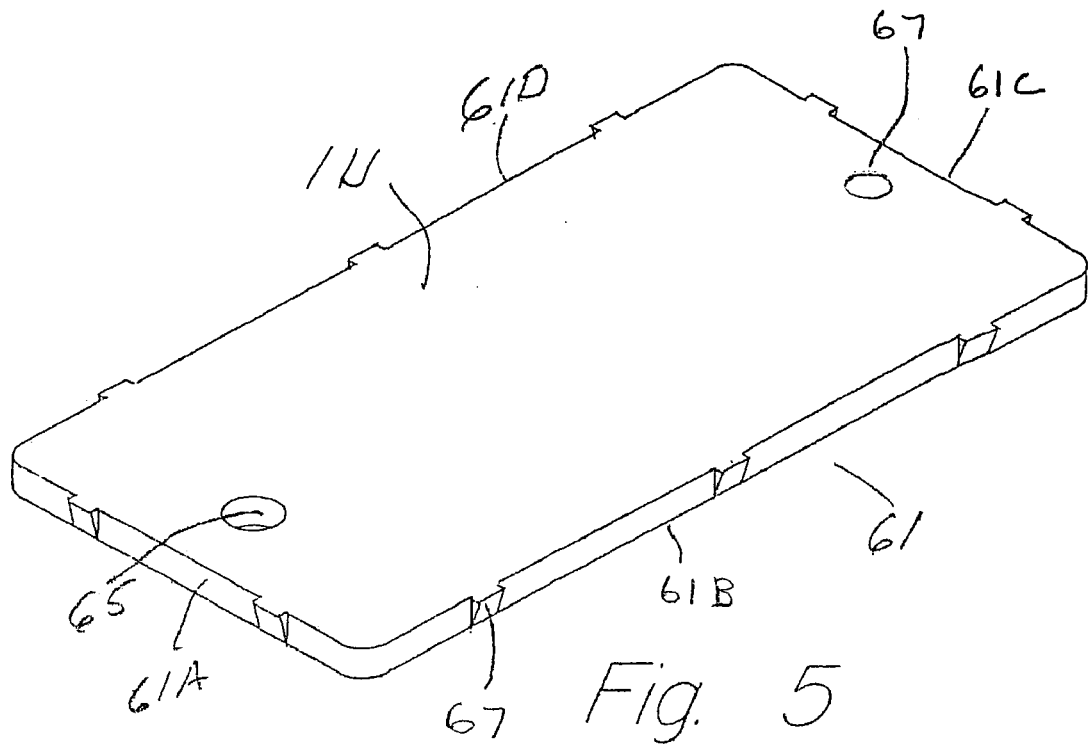
FIG. 5 illustrates the upper side of another lid of the invention.
Figure 6:
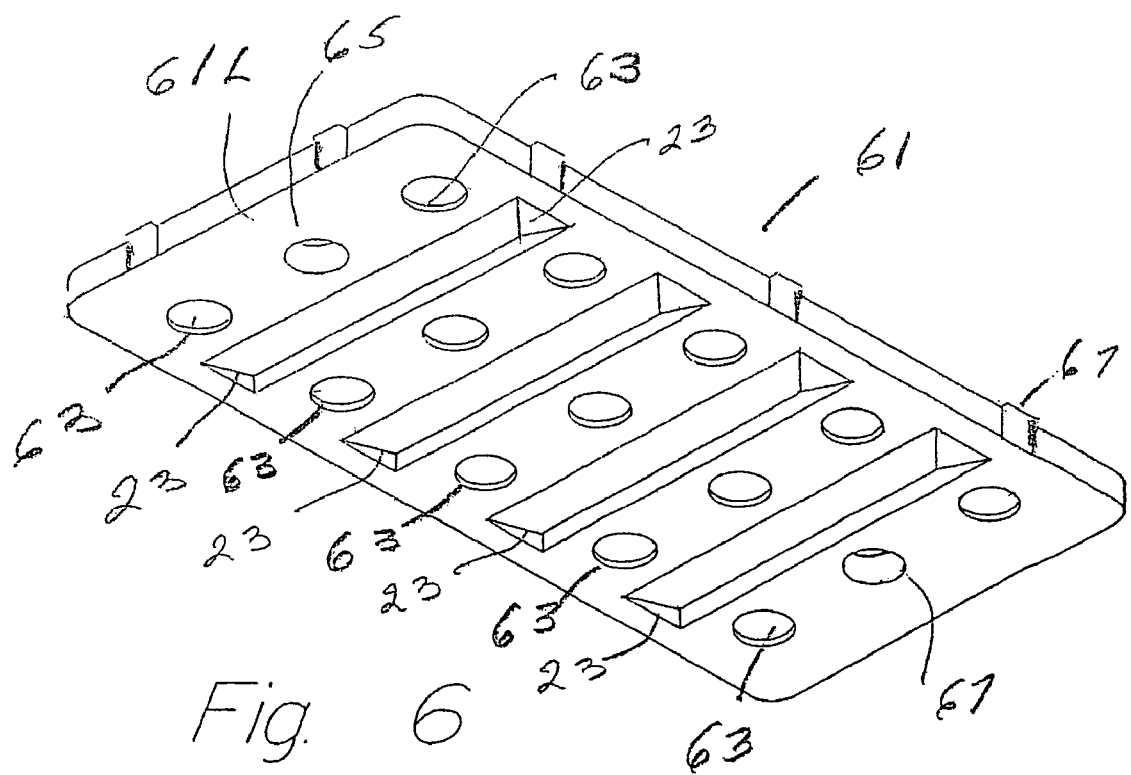
FIG. 6 illustrates the lower side of the lid of FIG. 5.

Referring to FIGS. 5 and 6, the lid 61 is compression molded from a suitable plastic such as medium density polyethylene. It is similar to lid 21M except that it is longer; it does not have the central opening 43; it has 4 spaced recesses 23 and five spaced rows of circular recesses 63 in its lower side. The lid 61 has a flat or planar upper surface 61U, a flat or planar lower surface 61L; edges 61A, 61B, 61C, 61D; and wedges 67. The length, width, and height of the lid 61 in inches may be 26½, 15, and 1½ respectively. The recesses 23 have the same dimensions as recesses 23 of FIGS. 1 and 2. In the embodiment of FIGS. 5 and 6, adjacent recesses 23 may be spaced 3 inches apart. The round recesses 63 may have a diameter of 2¼ of an inch and a depth of ¾ of an inch. Recesses 63 help perform the function of recesses 23.

Apertures 65 and 67 extend through the lid 61 and are used as a touch read hole for use for reading the meter in the box and as a finger hole respectively.

Figure 7:
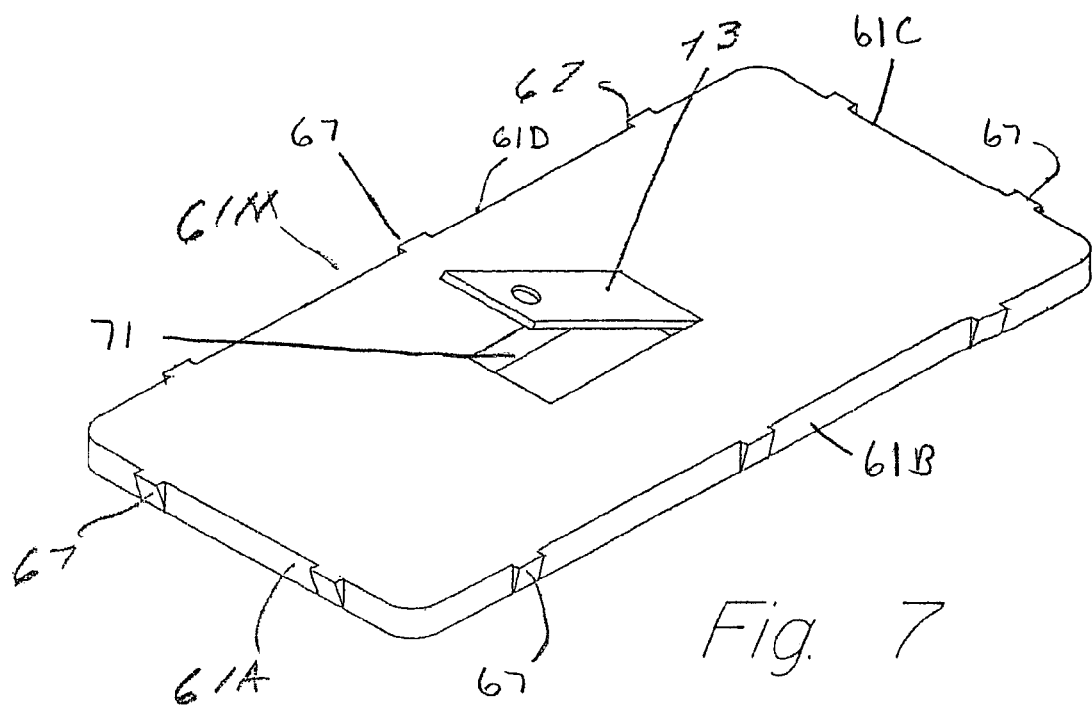
FIG. 7 illustrates the upper side of another lid of the invention.
Figure 8:
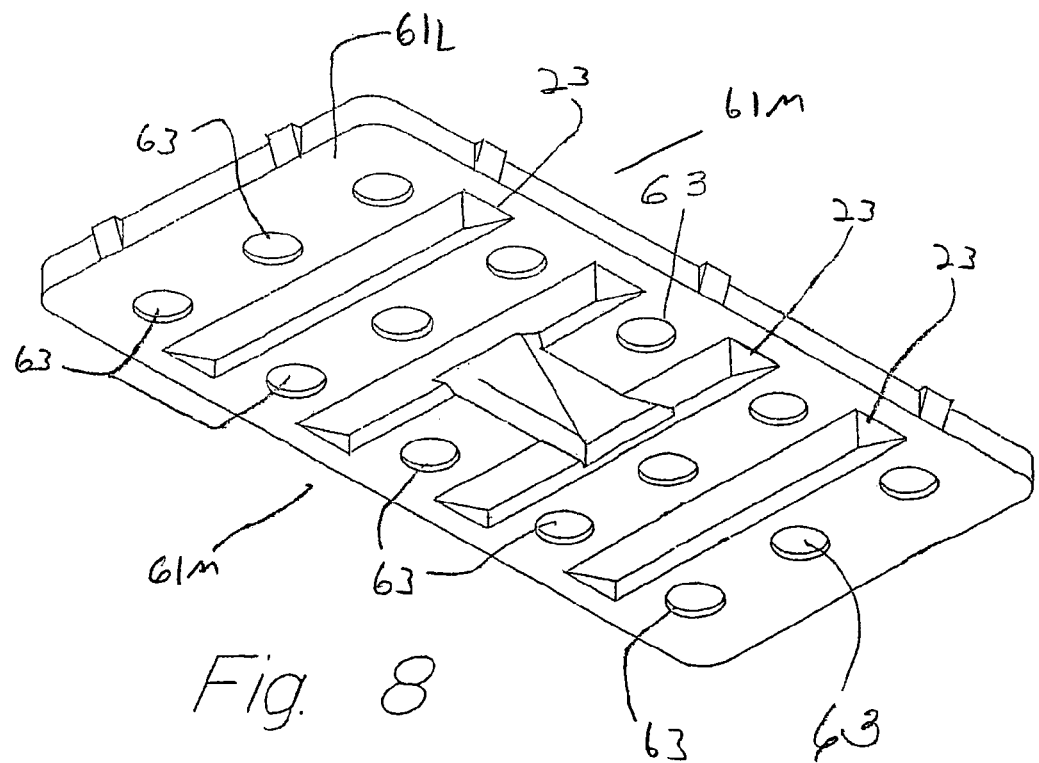
FIG. 8 illustrates the lower side of the lid of FIG. 7.
Figure 14:
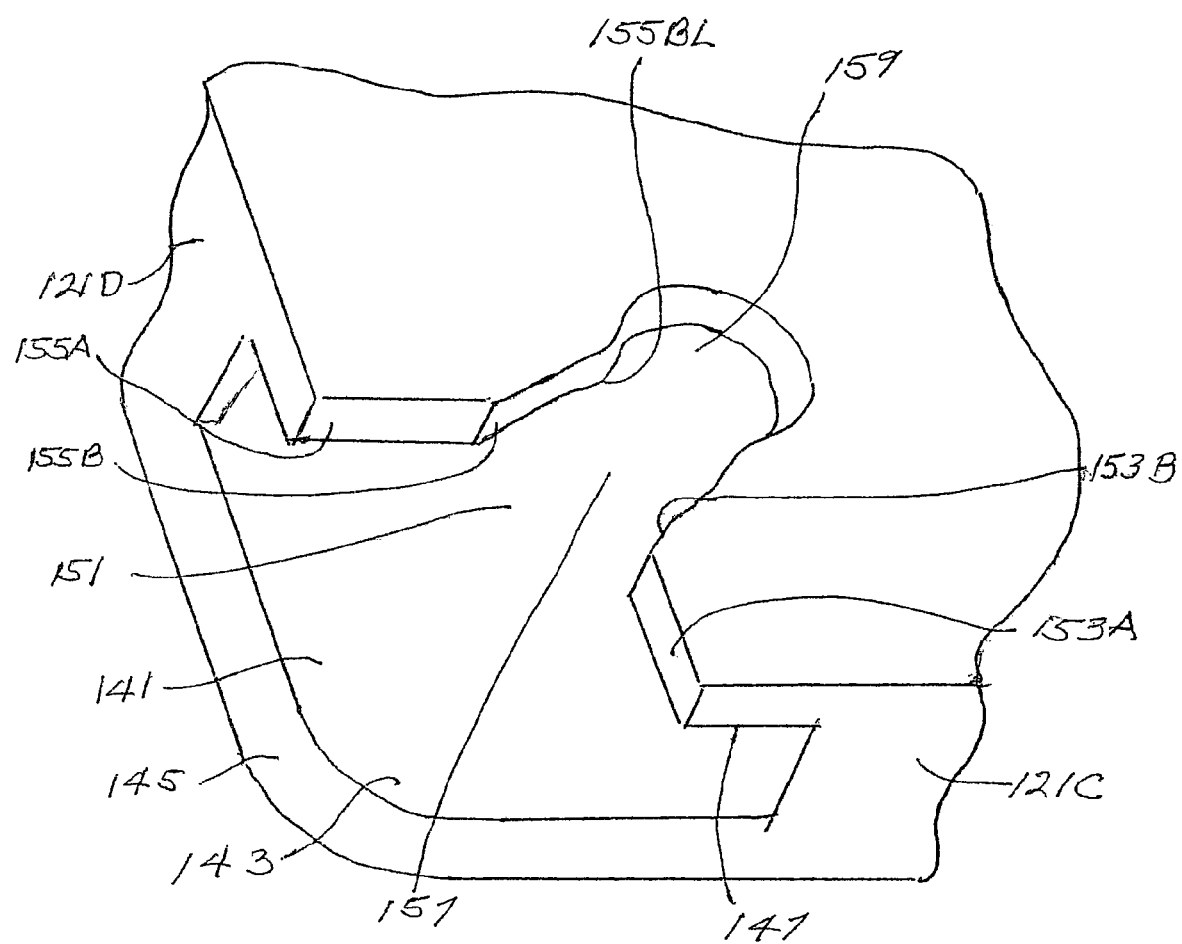
FIG. 14 is an isometric bottom view of the cavity of FIG. 13.
Figure 15:
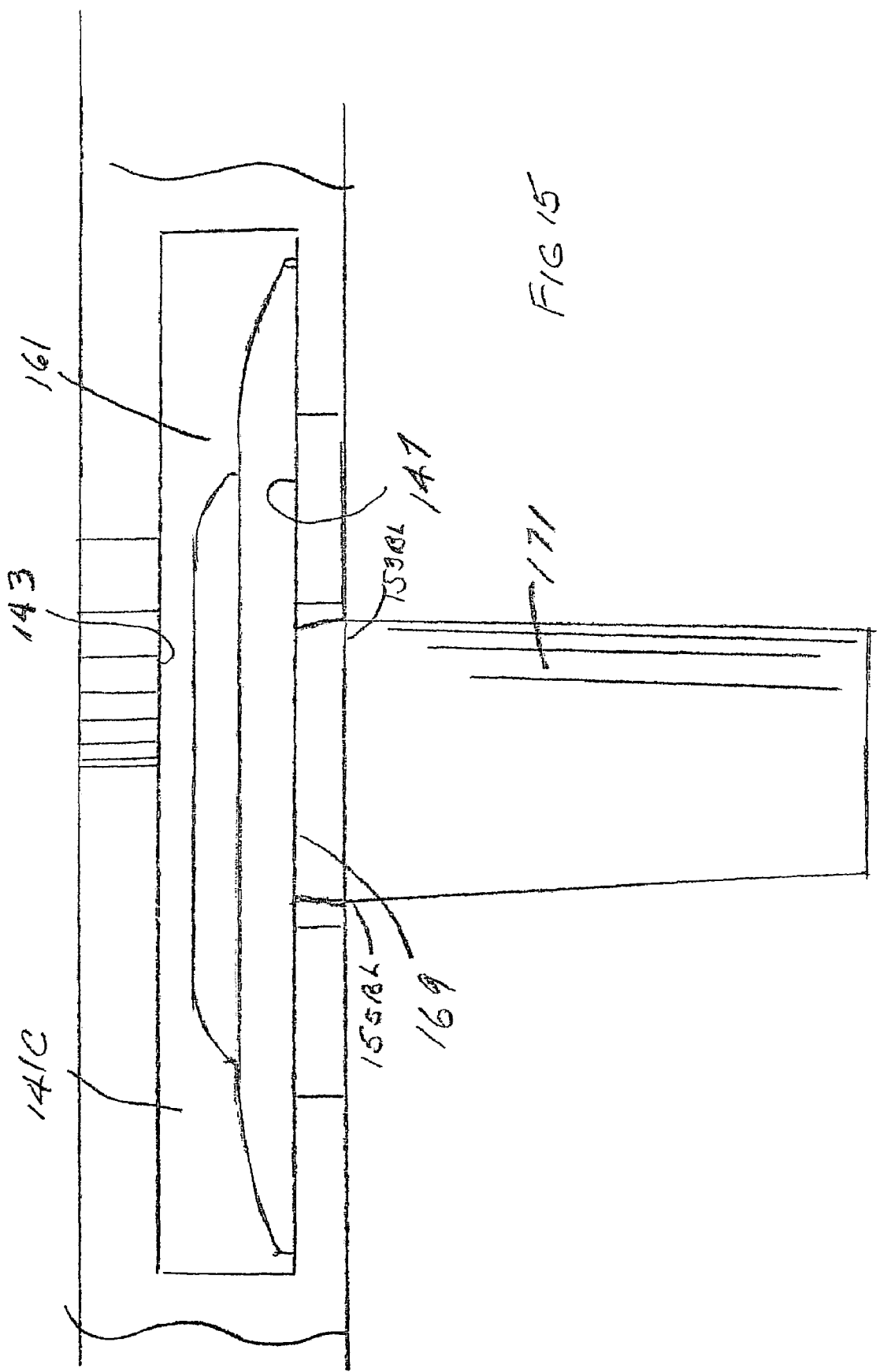
FIG. 15 is an edge view of the transponder device cavity with a transponder device supported in the cavity.
Figure 16:
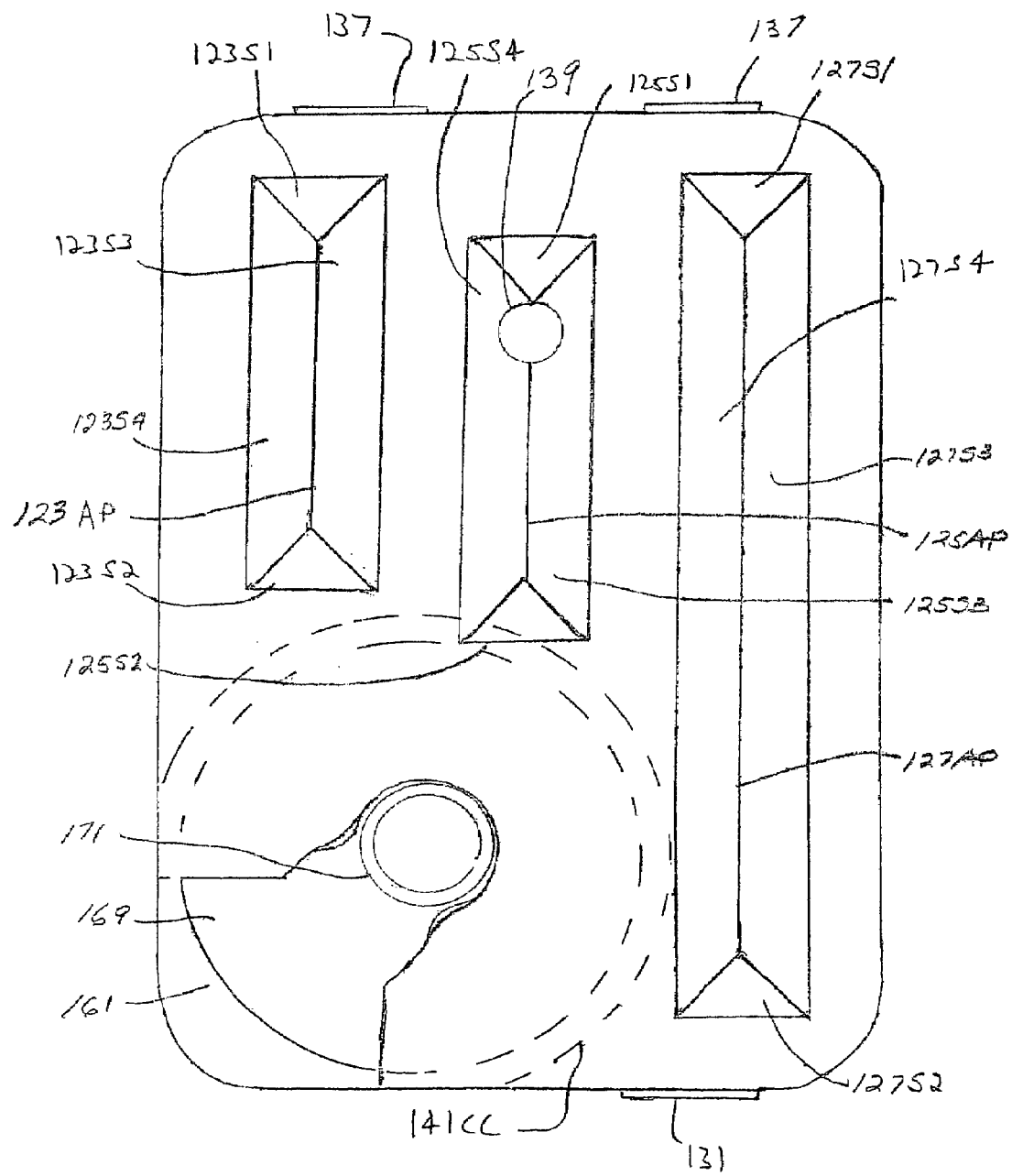
FIG. 16 is a view of the bottom side of the lid of FIG. 11 illustrating the transponder device located in the cavity.
Figure 17:
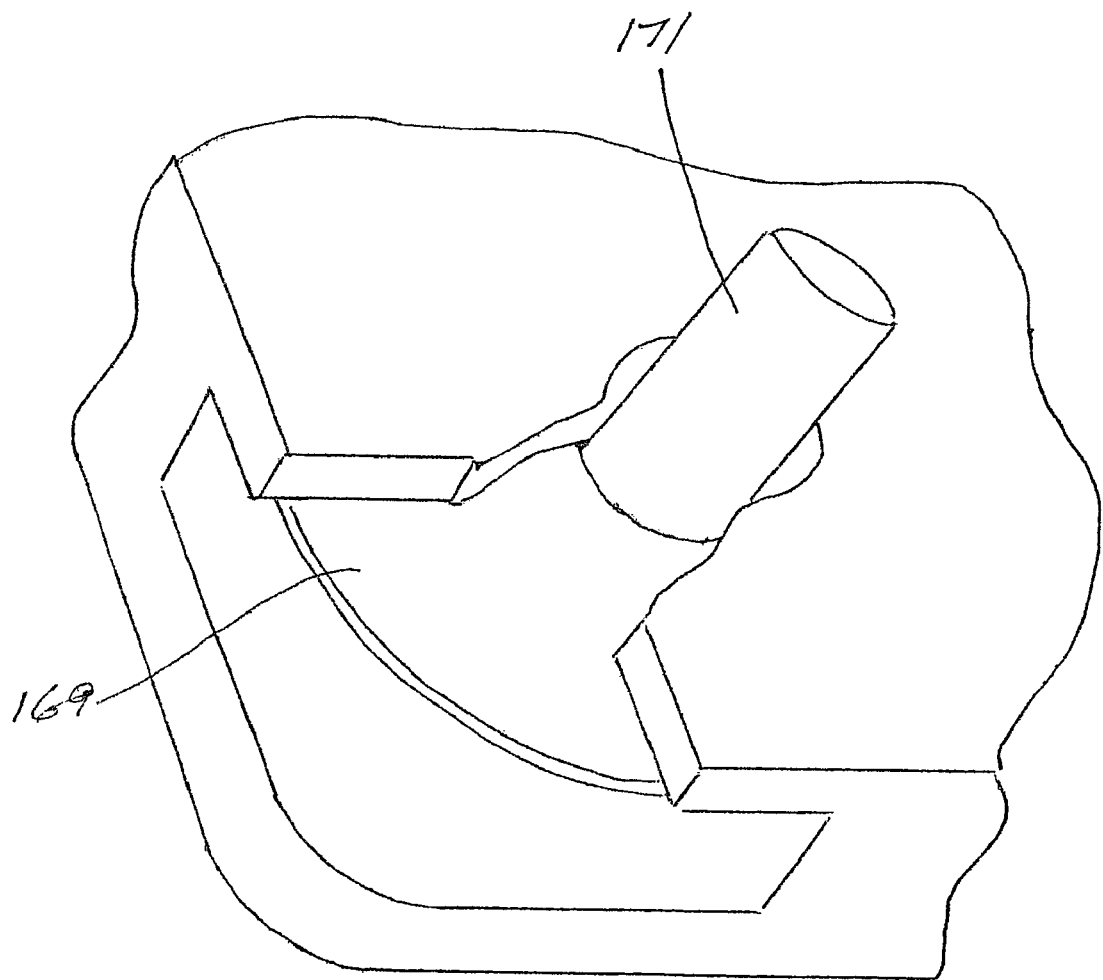
FIG. 17 is a view similar to that of FIG. 14 illustrating the transponder device located in the cavity.

Referring to FIGS. 7 and 8, the lid 61M is compression molded from a suitable plastic material such as medium density polyethylene. The lid 61M is similar to the lid 61 except that it has a central opening 71 with a hinged cover 73 for use for manual reading of the meter in the box. Apertures 65 and 67 are not employed and have in their place two circular recesses 63. In FIGS. 7 and 8, the same reference numerals identify the same components as shown in FIGS. 5 and 6. The dimension of the lid 61M may be the same as those of lid 61.

In the embodiment of FIGS. 1-10 the lengths of the recesses 23 are equal to a substantial portion of the length of the lid along which the recesses extend and are greater than one half of said lengths of the lid and are a little greater than ¾ of said lengths of the lid. For each lid, the area of the lower surface also is greater than the total area of the recesses 23 in the plane of the lower surfaces of the lid.

The median density range of the polyethylene used in forming the lids of FIGS. 1-10 is 0.938-0.942.

Compression load tests were carried out on the lid of FIGS. 1-6, 9, 10 and on the lid of FIGS. 7 and 8. The tests were performed utilizing a 9"×9" steel plate placed on the lid center. Prior to testing, each sample was placed on steel blocks around the perimeter of the lid to simulate the lip of the meter box.

Tests were performed on three lids of the embodiment of FIGS. 1-6, 9, 10. The three lids tested withstood a total load in pounds of 9380; 12,230; 8,910, respectively.

The lid of FIGS. 7 and 8 had a length of 26 inches and a width similar to that of lid 61. Tests were performed on two lids of the embodiment of FIGS. 7 and 8. The two lids tested withstood a total load in pounds of 14,070; 12,070, respectively.

It appears that the lid of FIGS. 7 and 8 withstood a greater load since it did not have the recesses 27, 29, 31, 33 of the lid of FIGS. 1-4, 9, 10.

The lids described with respect to FIGS. 1-10 are all rectangular in shape. The plastic lids however may be circular or oblong in shape with planar upper and lower surfaces. All of the lids of FIGS. 1-10 have at least two parallel recesses 23 formed in their lower surfaces. The lengths of at least one of the recesses 23 will be equal to a substantial portion of the length of the lid along which the recess extends and greater than one half of said length of the lids. In addition, the area of the lower surface greater than the total area of the recesses 23 in the plane of the lower surfaces of the lid.

Figure 21:
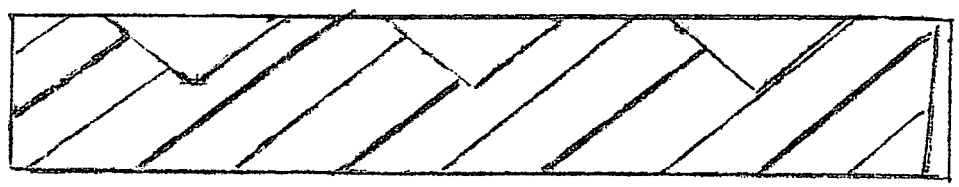
FIG. 21 is a cross-section of FIG. 11 as seen along lines 21-21 thereof.
Figure 20:
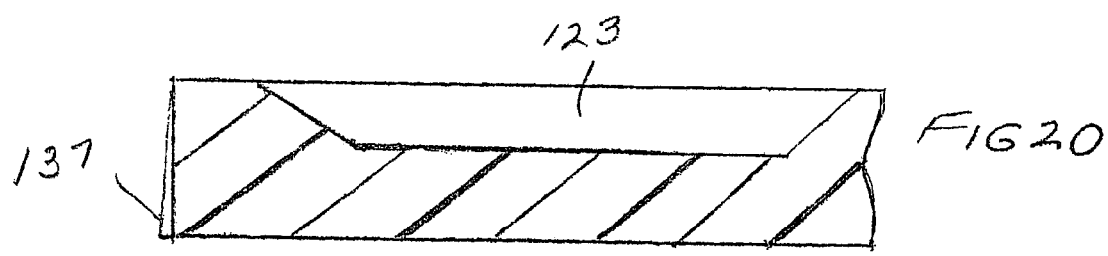
FIG. 20 is a cross-section of FIG. 11 as seen along lines 20-20 thereof.
Figure 19:
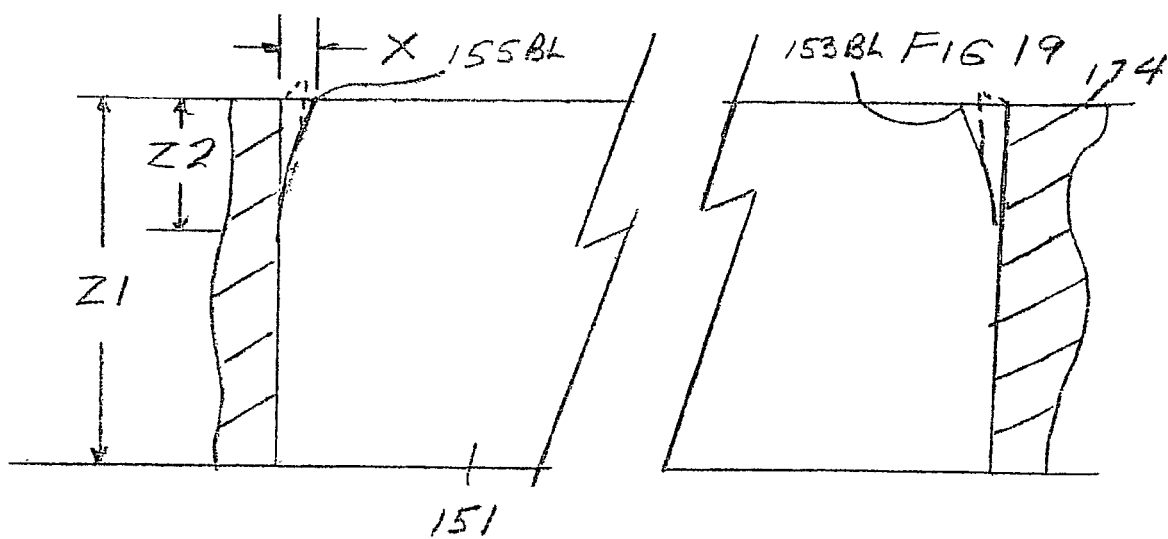
FIG. 19 is an enlarged view of the passageway leading to the opening for receiving the stem of a transponder device.
Figure 18:
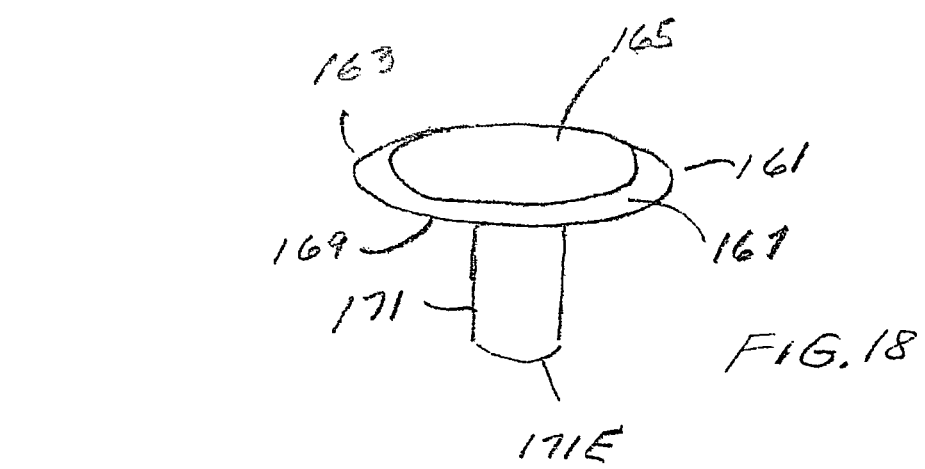
FIG. 18 is an isometric view of the transponder device of FIGS. 15, 16, and 17.
Figure 25:
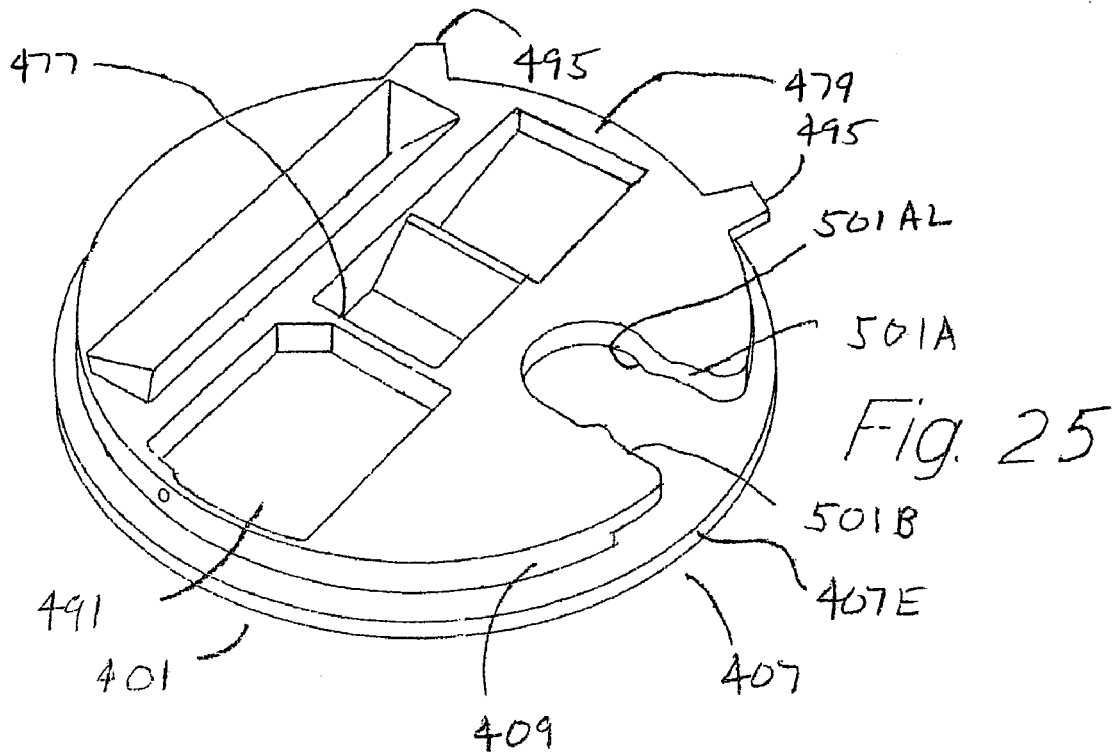
FIG. 25 is an isometric view of the lower side of the lid of FIG. 24.
Figure 28:
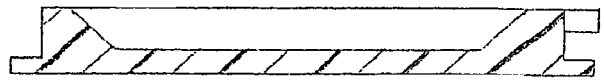
FIG. 28 is a cross-sectional view of the lid of FIG. 24 as seen along lines 28-28 thereof.
Figure 30:
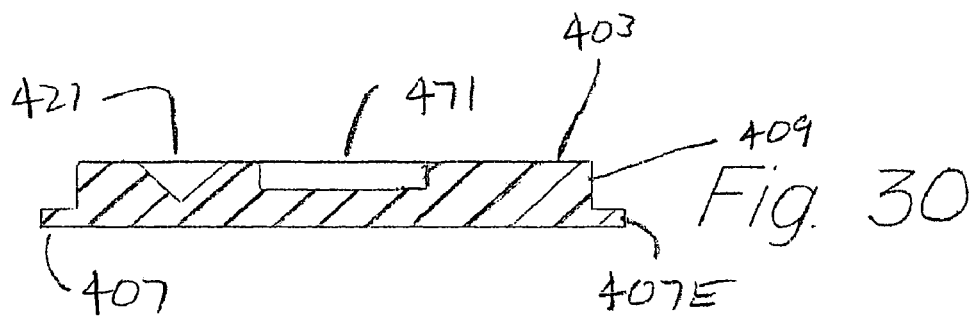
FIG. 30 is a cross-sectional view of the lid of FIG. 24 as seen along lines 30-30 thereof.

Referring now to FIGS. 11-21, the lid is identified by reference numeral 121. It is compression molded from a suitable plastic material such as median density polyethylene. The lid comprises an upper side having a flat or planar upper surface 121U and a lower side having a flat or planar lower surface 121L. The upper and lower sides are rectangular with four edges 121A, 121B, 121C, 121D. Formed in the lower surface during the molding process are three parallel recesses 123, 125, 127. The recess 123 has four edges 123A, 123B, 123C, 123D at the surface 121L. The recess 125 has four edges 125A, 125B, 125C, 125D at the surface 121L. The recess 127 has four edges 127A, 127GB, 127C, 127D at the surface 121L. Formed on each of edges 121A and 121C are wedges or lugs 137 which extend outward from the upper surface 121U and taper downward to the lower surface 121L as seen in FIG. 21. The wedges 137 may be shaved or cut to the desired shape in order to allow the lid to fit into the top opening of the utility box. Also drilled through the lid 121 is a finger hole 139 for gripping purposes to more easily allow the lid to be fitted to or removed from the utility box.

The purpose of the recesses 123, 125, 127 is to enhance curing of the plastic during the forming process and hence to minimize breakage of the lid as discussed previously with respect to the lids of FIGS. 1-10. It is believed that improved results were obtained since the recesses allowed a better heat transfer of the hot flowable plastic during the molding process and enhanced curing of the plastic.

The inside surfaces of the recesses are formed in a manner to strengthen the lid. In this respect surfaces 123S1, 123S2; 125S1, 125S2; 127S1, 127S2 form triangles. Surfaces 123S3, 123S4; 125S3, 125S4; 127S3, 127S4 form trapezoids. The four surfaces of each recess 123, 125, 127 slant upward from the lower surface 121L and meet at the three apexes 123AP, 125AP, 127AP respectively and act to provide support and strengthen the lid even though the recesses result in less lid material. Recesses 125 and 127 are shaped in a manner similar to that of recess 123 except recess 127 is longer than recess 123.

In one embodiment, the length of each of the edges 123A, 123C, 125A, 125C, 127A, 127C is about two inches. The length of each of edges 123B, 123D, 125B, 125D is about 6½ inches. The length of edges 127B, 127C is about 13.5 inches. The height of each of the recesses 123, 125, 127 from the surface 121L to their apexes 123AP, 125AP, 127AP is about $^{14}/_{16}$ of an inch. The width W and length L of the lid 121 are about 10 and 14.75 inches respectively. The height H of the lid 121 is about 1.75 inches.

The total surface area of the lower side 121L outside of the recesses 123, 125, 127 and outside of the opening 141, 151, 157, 159 is greater than the area of the recesses 123, 125, 127 and the opening 141, 151, 157, 159 in the plane surface 121L. The lid 121 between the surfaces of recesses 123, 127, and most of 125 and the upper surface 121U is solid plastic.

An opening 141 extends inward below the upper surface 121U from the two edges 121C and 121D to a cavity 141C which is the only cavity formed in the lid. The opening 141 comprises an upper wall 143, having a rounded side wall 145 extending from edges 121C and 121D and a lower wall 147 which forms a shelf. The cavity 141C is defined by the walls 145 and 147 and an interior partially circular wall 141CC. The lower wall 147 has an opening 151 defined by wall portions 153A and 155A which extend inward from edges 121C and 121D and lead to side walls 153B and 155B defining a passageway 157 which leads to a stem opening 159. The purpose of the cavity 141C is to receive the housing of a transponder device to be supported by the shelf 147 with the stem of the transponder device extending downward through the stem opening 159. A transponder device of this type is shown at 161 at FIGS. 15, 16, 17 and 18. The housing is a disc shaped housing member 163 having an upper central wall portion 165 formed of plastic, an outer upper wall portion 167 formed of metal, a bottom wall portion 169 formed of metal, and an elongated annular stem 171 formed of metal extending downward from the bottom wall 169. The diameter of the stem 171 tapers slightly from the wall 169 to its end 171E. A transponder device of this type is commercially available from Itron, Inc. as disclosed in U.S. Pat. No. 6,218,995B1 which patent is incorporated herein by reference.

The purpose of the transponder device is to read the output of i.e. a water meter located in the ground in the meter box which supports the lid. Electrical leads extend downward through the stem 171. Equipment powered by a battery will read the output of the water meter and transmit its output to the equipment in the housing when activated. Reading can be accomplished by sending a radio signal for example from a vehicle on the road to activate the transponder device which in turn will send a signal to the equipment in the vehicle to obtain a record of the amount of water used by the homeowner or business during the month. Since the lid 121 is formed of plastic, the transponder device can receive and transmit electromagnet signals through the plastic.

It is desirable that some means be provided to hold the transponder device in the cavity. Moreover, the manufacturer of the transponder device has indicated that the upper side 165 of the transponder device should be located at least ⅛ of an inch below the surface of the wall 143 of the cavity 141. A separate wedge could be used to wedge the transponder device in the cavity, however, this is undesirable since it is one more thing that field personnel would have to carry in locating and holding the transponder device in the cavity. In addition, the installer may push the wedge in with too much force and damage the transponder and the wedge in place may apply to much pressure to the transponder and damage or alter the performance of the transponder.

A snap or pressure fit is provided for holding the base 171 of the transponder device 161 in the opening 159 and hence the housing 163 of the transponder device 161 in the cavity 141C. This is accomplished by forming thin lips 153BL and 155BL at the side edges 153B and 155B at the bottom shelf on each side of the passageway which are flexible and resilient. The normal width PW of the passageway 157 at the lips 153BL and 155BL is slightly less than the diameter of the stem 171 at the level of the lips such that the stem 171 can be manually pushed through the passageway 157 moving the lips 153BL and 155BL aside or out of the way to allow the stem to be located in the opening 159. The lips 153BL and 155BL then will move inward toward each other to retain their original state or position normally preventing the stem 171 from moving out of the opening 159. Thus the stem 171 is held in the opening 159 and the shelf 147 supports the housing 163 in the cavity 141C below the upper wall 143 (during its intended use) in accordance with the manufacturer's recommendations. The transponder device 161 may be removed by pulling the stem 171 through the passageway 157 to force the flexible or resilient lips 153BL and 155BL out of the way allowing the stem 171 to be removed from the stem opening 159 and the housing 163 out of the cavity 141C.

For the stem 171 having a diameter of about 1.75 of an inch at the level of the lips 153BL and 155BL, the passageway 157 may have a quiescent or at rest width PW (See FIG. 11) of about 1$^{11}/_{16}$ of an inch. For the wall 174 (formed of medium density polyethylene) having a thickness Z1 about ⅜ of an inch, each lip 153BL, 155BL has an at rest dimension Z2 of about $^{2.5}/_{16}$" and an at rest dimension X of between about $^{1}/_{32}$" and ⅛" (See FIG. 19). The lips extend to a thin line at 153BL at the top level of the shelf 174. Referring to FIG. 11, the dimension Y is about ½". By pushing the stem through the passageway 157 against the lips 153BL and 155BL, the lips will be pushed out of the way, as shown in dotted lines in FIG. 19, allowing the housing to be inserted into or removed from the opening after which the lips 153BL and 155BL will return to their quiescent state. For a transponder 161 having a housing or head outside diameter of 6¾" and a maximum housing height of about ¹¹/₁₆", the diameter of the cavity 41C will be a little greater than 6¾", sufficient to easily receive the housing 163, and its height may be about ¹⁵/₁₆". These dimensions may vary depending on the size of the transponder. The opening 141, cavity 141C, and the walls 153A, 155A, 153B, 155B, opening 159, and the lips 153BL and 155BL are formed during the molding process, and touched up with a router bit if desired.

Referring to FIGS. 22 and 23, the lid is identified by reference numeral 181. It is compression molded from a suitable plastic material such as medium density polyethylene. The lid comprises an upper side having a flat or planar upper surface 181U and a lower side having a flat or planar lower surface 181L. The edge of the lid comprises a surrounding flange 187 with a lower edge 189 spaced inward from the outer edge 187E of the flange 187. The lower edge 189 has two straight sides 189A and 189B and two rounded sides 189B and 189C. The flange 187 comprises two straight portions 187EA and 187EB and two rounded portions 187EC and 187ED.

The lid 181 is small in area within the edges 187E and 189 and has a single recess 201 formed in its lower side 181L during the molding process to enhance curing of the plastic material during the forming process and hence to minimize breakage of the lid. The recess 201 is similar to either of recesses 123, 125, 127 but it has different dimensions. In this respect the recess 201 has two trapezoid sides 201S1 and 201S2 and two triangular shaped sides 201S3 and 201S4 which flare outward to the surface 187L from an elongated apex 201A. The lid 181 between the surfaces of recess 201 and the top surface is solid plastic.

An opening 241 extends inward below the flange 187 from the side 189D to a cavity 241C which is the only cavity formed in the lid. The opening 241 comprises an upper wall 243, extending from side 189D and a lower wall 247 which forms a shelf. The cavity 241C is defined by walls 243 and 247 and wall 241CC. The lower wall 247 has an opening 251 defined by wall portions 253A and 255A which extend inward and lead to side walls 253B and 255B defining a passageway 257 which leads to a base opening 259. The purpose of the cavity 241C is to receive the housing of a transponder device of the type shown in FIG. 18. to be supported by the shelf 247 with the stem of the transponder device extending downward through the stem opening 259 with the top of the transponder device spaced from the wall 243 the desired amount.

A snap or pressure fit is provided for normally holding the stem 171 of the transponder device 161 in the opening 259 and hence the housing 163 of the transponder device 161 in the cavity 241C in a manner similar with that of the embodiment of FIG. 11-21. This is accomplished by forming thin lips 253BL and 255BL in the side edges 253B and 255B at the bottom shelf on each side of the passageway which are flexible and resilient. The normal width of the passageway 157 at the lips 253BL and 255BL is slightly less than the diameter of the stem 171 at the level of the lips such that the stem 171 can be manually pushed through the passageway 257 moving the lips 253BL and 255BL aside which then will move inward toward each other to retain their original state or position normally preventing the stem 171 from moving out of the opening 259 during its intended use. Thus the stem 171 is held in the opening 259 which holds the head 163 in the cavity 241C. The transponder device 161 may be removed or inserted by pulling or pushing the stem 171 through the passageway 257 to force the flexible lips 253BL and 255BL out of the way allowing the stem 171 to be inserted or removed into or from the opening 259 and the head 165 into or out of the cavity 241C. The dimensions of the lips 253BL and 255BL may be similar to those of the embodiment of FIGS. 11-21 and may be spaced apart the same amount as those of the embodiment of FIGS. 11-21.

A shallow half round recess 261 is formed in the lower surface 181L to receive equipment. An aperture 263 is formed through the upper wall 261 of the recess 261 and hence through the lid.

The lid 181 between the surfaces of recess 201 and its upper surface is 181U solid plastic. The total surface area of the surface 181L outside of the recesses 201 and 261 and outside of the maximum lateral boundaries of the cavity 241 is greater than the areas of the recesses 201 and 261 in the plane of the surface 181L. The opening 241, cavity 241C walls 253A, 255A, 253B, 255B, lips 253BL, 255BL and opening are formed during the molding process and touched up with a router bit if desired.

Referring to FIGS. 24-30, the lid 401 is formed of plastic material and is circular in shape, having a bottom side 403 and a top side 405. The top side 405 and bottom side 403 are generally flat. The edge of the lid comprises a surrounding flange 407 with a lower edge 409 spaced inward from the outer edge 407E of the flange 407.

An elongated rectangular shaped recess 421 is formed in the lower surface 403 during the molding process. The recess 421 comprises two generally flat sides 425 and 427 which flare outward to the surface 403 from a center line 429 and two triangular shaped surfaces 431 and 433 which flare outward to the surface 403 from opposite ends of the line 429. Each of the sides 425 and 427 is trapezoidal in shape and together they define an angle of about 90 degrees and form a triangle with the plane of the surface 403 as seen in the cross-section of FIG. 30.

Figure 29:
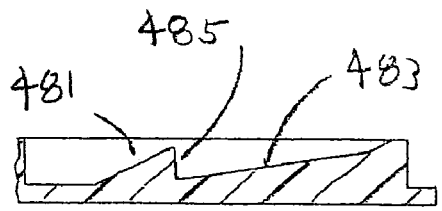
FIG. 29 is a cross-sectional view of the lid of FIG. 24 as seen along lines 29-29 thereof.

Also provided is an elongated rectangular shaped recess 471 which is formed in surface 403. The recess 471 comprises two parallel elongated sides 473 and 475A, 475B and two parallel sides 477 and 479. Sides 473, 475A, 475B and 477 are perpendicular to the surface 403. The recess 471 in cross-section as seen in FIG. 29, is saw-tooth in shape having two surfaces 481 and 483 which are oblique relative to the surface 403 and a surface 485 which is perpendicular relative to surface 403. The lid 401 between the surfaces of recesses 421 and 471 and its upper surface 405 is solid plastic.

In addition, a recess 491 is formed in the surface 403 for holding a lock 493.

In one embodiment, the diameter of the flange 407 is about 12⅜ inches and the diameter of the edge 409 and hence of the surface 403 is about 11 inches. The widths and depth of the recess 421 is about 1½ and ¾ inches respectively. The lengths of the recess 421 is about 8½. The length and width of the recess 471 are about 6¼ and 2½ inches respectively. The dimensions of the slanted surfaces 481 and 483 along the length of the recess 471 are about 1½ and 3½ inches and the vertical dimension of surface 485 is about ½ inches. The length and width of the recess 491 are about 3½ inches and 3 inches respectively. The thickness of the lid from surface 403 to surface 405 is about 1¼ inches. Two prongs 495 extend outward from surface 403 spaced from the flange 407.

Formed in the edge 409 is an opening 501 which extends inward below the flange 407 and the top surface 405 to a rounded cavity 501C which is the only cavity formed in the lid. The cavity 501C is defined by a side wall 503, the wall portion 405A of the lid which is below the surface 405 which is level with the bottom of the flange 407 and a lower shelf 505 which follows the side wall 503 and extends a limited distance therefrom to define a shelf to removably hold a transponder device. The lower shelf 505 extends a limited distance to define an open portion 507 which leads to a central portion 507C.

The opening 507 is defined by wall portions 507A and 507B which have thin flexible and resilient lips 507AL and 507BL which act in the same manner as lips 153BL and 155BL to allow passage of the stem 171 into the central portion 507C of the opening 507 (by manually applying pressure to the stem) and hence the housing into the cavity 501C to normally hold the housing 163 (during its intended use) of the transponder device in the cavity 501C supported by the shelf 505, spaced from the lid wall 405A a sufficient amount and allows it to be removed by pressure applied thereto if desired.

On the top side 405, shallow recess 521 is formed in the surface 405 and which coincides with the position of the opening 501 to allow an aperture to be formed through the lid at this position if desired to allow a signal receiver and transmitter to extend through the lid from the utility box if the utility company wants to use this type of meter reading facility.

The lid of FIGS. 24-30 is compression molded from a plastic material such as medium density polyethylene. The recesses 421 and 471 are formed during the molding process to enhance curing of the plastic during the forming process to minimize breakage of the lid. The lock 493 of the lid is attached after the molding process.

The opening 501, cavity 501C, opening 507, walls 507A, 507B, and lips 507AL and 507BL are formed during the molding process, and touched up with a router bit if desired. The dimensions of the lips 507AL and 507BL may be similar to those of the embodiment of FIGS. 11-21 and spaced apart the same amount as those of the embodiment of FIGS. 11-21.

Load tests were carried out on the lid of FIGS. 11-21, 22, 23; and 24-30 in a manner similar to those described in connection with the lids of FIGS. 1-10 and the results were that the lid of FIGS. 11-21 withstood a load of 20,730 pounds; the lid of FIGS. 22, 23 withstood a load of 20,675 pounds; and the lid of FIGS. 24-30 withstood a load of 8,565 pounds.

The invention claimed is:

1. A lid for a utility box, comprising:
a member molded from a plastic material and having spaced apart upper and lower sides,
said lower side comprising a lower surface having an outer edge,
an opening formed in said outer edge of said member by wall structure and leading to a cavity for holding a transponder device,
the transponder device is of the type having a stem extending from a housing,
said opening having a portion for receiving the stem of the transponder device such that the housing may be located in said cavity by way of said opening with the stem extending through said portion of said opening,
said opening having a passageway with a width normally less than the width of the stem which passageway may be expanded by pressure applied to said wall structure by the stem to allow the stem to be moved through said passageway to allow insertion and removal of the stem into and from said portion of said opening by way of said passageway,
when the stem is located in said portion of said opening, the pressure applied to said wall structure is released such that said wall structure will hold the stem in said portion of said opening and hence the housing in said cavity.

2. The lid of claim 1, wherein:
said passageway comprises a wall formed of plastic material having a thin portion of plastic material which extends into said passageway in an at rest portion to define a minimum width of said passageway and which can be moved to a position to expand the width of said passageway by pressure applied to said thin portion of plastic material by the stem of the transponder to allow passage of the stem through said passageway and when said pressure is released, said thin portion of plastic material returns to said at rest position.

3. The lid of claim 1, wherein:
said passageway comprises two spaced apart wall portions formed of plastic material each of which comprises a thin portion of plastic material which extends into said passageway at an at rest position to define the minimum width of said passageway and which can be moved to a position to expand the width of said passageway by pressure applied to said thin portions of plastic material by the stem of the transponder to allow passage of said stem through said passageway and when said pressure is released said thin portions of plastic material return to said at rest positions.

4. The lid of claim 1, wherein:
said outer edge extends around said member next to said lower side and which faces outward of said member,
said lower surface is contiguous with said outer edge at least on two opposite sides of said outer edge.

5. The lid of claim 1, wherein:
said outer edge comprises a first pair of spaced apart outer edges which face in opposite direction from each other outward from said member and a second pair of spaced apart outer edges which face in opposite directions from each other outward from said member,
said first pair of outer edges are transverse to said second pair of opposite edges,
said lower surface extends to and is contiguous with said first and second pairs of outer edges.

6. The lid of claim 1 in combination with a transponder of the type having a stem extending from a housing with said stem having a size sufficient for expanding said passageway when moved therethrough to allow insertion and removal of said stem into and from said portion of opening.

* * * * *